J. H. Buckman Assignor to Self & P. W. Reinshagen.

Impt in Shaft Pulleys.

4288

REISSUED MAR 7 1871

Witnesses.

Herman Merrell

John Bode.

Inventor:

J. H. Buckman

By Wood & Boyd

Attys.

United States Patent Office.

JOHN H. BUCKMAN, OF CINCINNATI, OHIO, ASSIGNOR TO HIMSELF AND PETER W. REINSHAGEN, OF SAME PLACE.

Letters Patent No. 98,144, dated December 21, 1869; reissue No. 4,288, dated March 7, 1871.

IMPROVEMENT IN DEVICES FOR SECURING PULLEYS TO SHAFTS.

The Schedule referred to in these Letters Patent and making part of the same.

I, JOHN H. BUCKMAN, of Cincinnati, Hamilton county, State of Ohio, have invented certain new and useful Improvements in Devices for securing Pulleys and Gear-Wheels, &c., to shafts; and I do hereby declare the following to be a sufficiently full, clear, and exact description thereof, to enable others skilled in the art to which my invention appertains to make and use the same, reference being had to the accompanying drawing making part of this specification.

*Nature and Objects of the Invention.*

My invention has for its object the production of pulleys and gear-wheels, and fastening devices to be used with them, applicable alike to both hollow and solid shafting, and so constructed as to secure the hub of the pulley or wheel to the shaft in such a manner that the wheel or pulley will not, in the act of fastening, be forced out of its concentric position on the shaft, but will cause the hub to hug the shaft equally in all directions; and consists—

First. In constructing a pulley or wheel with the central part of the hub (that part to which the spokes or arms are attached) solid or continuous in its circumference, with slitted projections at both ends, to be contracted to fit or hug the shaft without strain to the body of the pulley.

Second. My invention further consists in constructing rings adapted to surround and contract the slitted ends of the hub.

Third. My invention further consists in constructing the slitted ends of the hub in the form of a truncated cone, to which rings, bored to match, are fitted, so that when driven on they will contract these projections and compel them to hug the shaft.

*Description of Accompanying Drawing.*

*General Description.*

Figure 1:
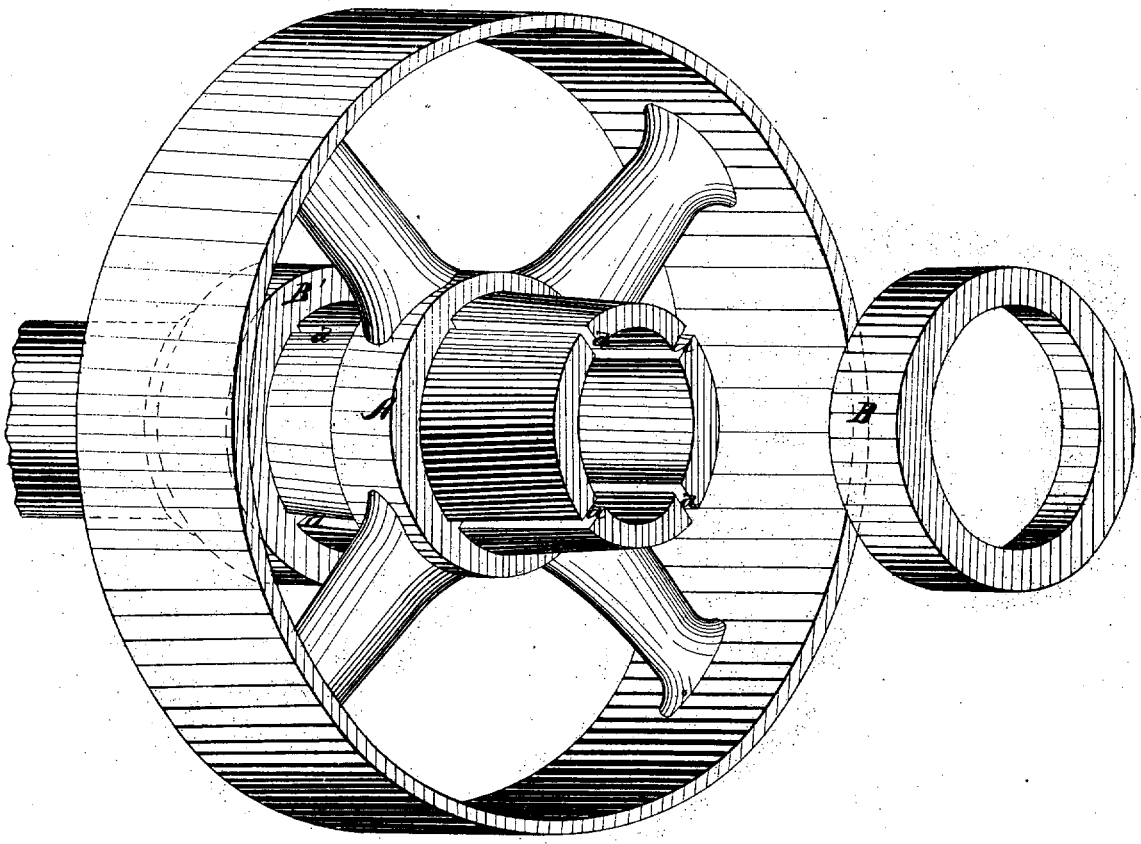
Figure 1 is a perspective view of a pulley embodying my invention, one of the rings being detached.
Figure 2:
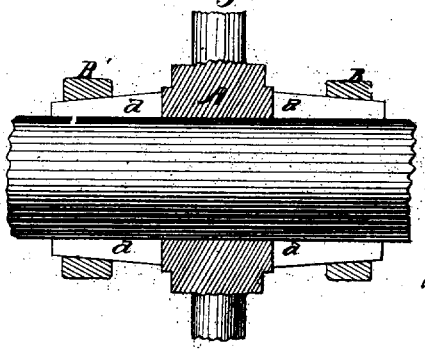
Figure 2 is an axial section of the hub, with rings for attachment in place.

A is the hub, which is usually cast in one piece with the pulley, and is bored to fit the shaft, and has projections outward from the arms, spokes, or connecting plate, at each end. These projections, from their extreme ends to points near the arms, are slitted, severed, or split entirely through at two or more points, *a a*, as shown, for the purpose of enabling them to be closed or contracted in size, so as to hug the shaft closely.

The projecting ends, with the slits *a a*, as shown, are made in the form of a truncated cone.

B B′ are tapering rings, bored to match the projecting ends of the hub.

The simple act of driving the rings B B′ onto the hub serves to force it to hug the shaft tightly in all directions, preserving the concentricity of the pulley or wheel, and, when properly made, the friction will hold the rings in place, dispensing with screws or other fastenings, and they may also be loosened and taken off by driving.

The fissured ends of the hub may, in various ways, be contracted to fit or hug its shaft, but I deem the above the cheapest and best.

It is well known that, in the use of the common taper-key or set-screw for securing pulleys, &c., to shafts, the inside of the hub, when fastened, has but two points of bearing on the shaft, and these mere line-bearings, and that neither the key nor set-screw is admissible for hollow shafts, in consequence of their liability to indent or collapse the shaft.

The key or set-screw also forces the pulley or wheel "out of true," even when a good fit, so that when these fastenings are used the inconvenient "driving fits" are essential.

With my device for the attachment of the pulley to the shaft, the hubs may be bored a loose fit, convenient to adjust and remove, and yet, when fastened, be always concentric to the shaft.

The device is equally applicable to hollow or solid shafting.

*Claims.*

I claim as new, and of my invention—

1. A pulley or gear-wheel, with the solid or continuous hub A, and slitted projections *a a*, adapted to be contracted to fit its shaft, substantially as herein set forth.

2. The driving rings B B′, adapted to surround and contract the hub of a pulley and fasten it to its shaft.

3. The truncated hub A, with slits *a a*, in combination with the tightening rings B B′, operating in the manner and for the purpose specified.

Witnesses: JOHN H. BUCKMAN.

C. W. SMITH,

J. W. WINDER,